_United States Patent_ [19]

Komuro et al.

[11] Patent Number: 5,921,194

[45] Date of Patent: Jul. 13, 1999

[54] SEWING MACHINE CONTROL DEVICE WITH DISPLAY FOR DISPLAYING CONTROL INFORMATION OF SEWING MACHINES

[75] Inventors: Kyoji Komuro; Xiao Ming Zheng, both of Nagoya, Japan

[73] Assignee: Brother Kogyo Kabushiki Kaisha, Nagoya, Japan

[21] Appl. No.: 08/965,763

[22] Filed: Nov. 7, 1997

[30] Foreign Application Priority Data

Nov. 13, 1996 [JP] Japan .................................. 8-301928
Nov. 13, 1996 [JP] Japan .................................. 8-301930

[51] Int. Cl.⁶ .................................................. D05B 19/00
[52] U.S. Cl. .................................. 112/470.01; 112/102.5; 112/155; 112/445
[58] Field of Search .......................... 112/470.01, 470.06, 112/102.5, 155, 445, 277, 475.19; 364/470.09

[56] References Cited

U.S. PATENT DOCUMENTS 5,253,599  10/1993  Hashiride ............................. 112/155 X
5,313,896   5/1994  Hashiride .
5,784,986   7/1998  Morita .................................. 112/102.5

FOREIGN PATENT DOCUMENTS 5-76670-A   3/1993   Japan .

_Primary Examiner_—Peter Nerbun
_Attorney, Agent, or Firm_—Oliff & Berridge PLC

[57] ABSTRACT

A sewing machine control device that is capable of controlling a plurality of sewing machines, and that includes a display unit having a screen; an operability determination unit that determines operable ones of the plurality of sewing machines; and a window displaying unit that displays, on the screen of the display unit, a window for each operable sewing machine.

26 Claims, 14 Drawing Sheets

SEWING MACHINE CONTROL DEVICE WITH DISPLAY FOR DISPLAYING CONTROL INFORMATION OF SEWING MACHINES

BACKGROUND OF THE INVENTION

1. Field of the Invention

The present invention relates to a sewing machine control system capable of controlling a plurality of sewing machines and including a display device for displaying information relating to control of the sewing machines.

2. Description of the Related Art

Recently, sewing machines such as embroidery sewing machines can be connected to a personal computer so that sewing operations of the sewing machines can be controlled by the personal computer. For example, signals outputted from the personal computer can be transmitted to the plurality of sewing machines through a multiplexer so that the sewing machines can be individually controlled using time sharing.

U.S. Pat. No. 5,313,896 describes a system for embroidery machines wherein a plurality of sewing machines are connected to a single personal computer having a display. With this device, first a user inputs a number and the screen of the display is divided accordingly. For example, if the user inputs the number "4", the screen is divided into four different subdisplays. Next, the user inputs designated numbers of embroidery patterns he or she would like to sew, whereupon the selected embroidery patterns are displayed, each in one of the different subdisplays. The user then designates the embroidery pattern he or she wishes to have sewn by which sewing machine. As a result, at the bottom of the screen, an additional small subscreen is displayed showing the designated number of each embroidery pattern in correspondence with a number of the sewing machine presently sewing the embroidery pattern.

With such a conventional system, after the user turns off the power source of a sewing machine, or otherwise puts the sewing machine into an inoperable condition, he or she then stops the corresponding control program by performing a predetermined operation at the personal computer. On the other hand, after the user turns the power of the sewing machine on, or otherwise puts the sewing machine into an operable condition, he or she then starts the corresponding control program by performing another predetermined operation at the personal computer.

SUMMARY OF THE INVENTION

However, the system described in U.S. Pat. No. 5,313,896 has certain limits. For example, there is no way for the user to know if the sewing machines connected to the control device are in an operable condition. For example, a portion of the sewing machines might be unable to sew a desired embroidery pattern because their power sources are turned off or because they have no workpiece set in the support frame. Therefore, the user might waste time indicating that a certain sewing machine sew a certain embroidery pattern, only to find out that the sewing machine is not turned on yet.

It is also troublesome for a user to determine which sewing machine is sewing what embroidery pattern. When a user wants to know which sewing machine is sewing which embroidery pattern, he or she must first look at the small subscreen at the bottom of the screen to check the designated number of the embroidery pattern being sewn by that sewing machine. Then the user searches for the subscreen displaying the embroidery pattern with the same designated number.

Also, each time a change occurs in the operating condition of a sewing machine, the user must walk back and forth between the sewing machine and the personal computer to turn the power switch of the sewing machine on or off, or to start or stop a corresponding control program at the personal computer.

It is an objective of the present invention to overcome the above-described problems and to provide a sewing machine control system that overcomes the above-described problems.

In order to achieve these objectives, a sewing machine control device according to the present invention includes a display unit having a screen; an operability determination unit that determines operable ones of the plurality of sewing machines; and a window displaying unit that displays, on the screen of the display unit, a window for each operable sewing machine.

According to another aspect of the present invention a sewing machine control device includes: a display unit having a screen; an operability determination unit that determines a number of operable sewing machines of the plurality of sewing machines; and a screen division unit that divides display of the screen into sections according to the number of operable sewing machines determined by the operability determination unit.

BRIEF DESCRIPTION OF THE DRAWINGS

The above and other objects, features and advantages of the invention will become more apparent from reading the following description of the preferred embodiment taken in connection with the accompanying drawings in which:

FIG. 5 is a schematic view showing a control window displayed on the display of the personal computer when only a single sewing machine has its power source turned on;

FIG. 6 is a schematic view showing two control windows displayed on the display when two sewing machines have their power sources turned on;

FIG. 10 is a schematic view showing a screen section displayed on the display of the personal computer when a power source of a single sewing machine is turned on;

FIG. 11 is a schematic view showing two screen sections displayed when power sources of two sewing machines are turned on;

FIG. 12 is a schematic view showing four screen sections displayed when power sources of four sewing machines are turned on;

DETAILED DESCRIPTION OF THE PREFERRED EMBODIMENTS

Figure 1:
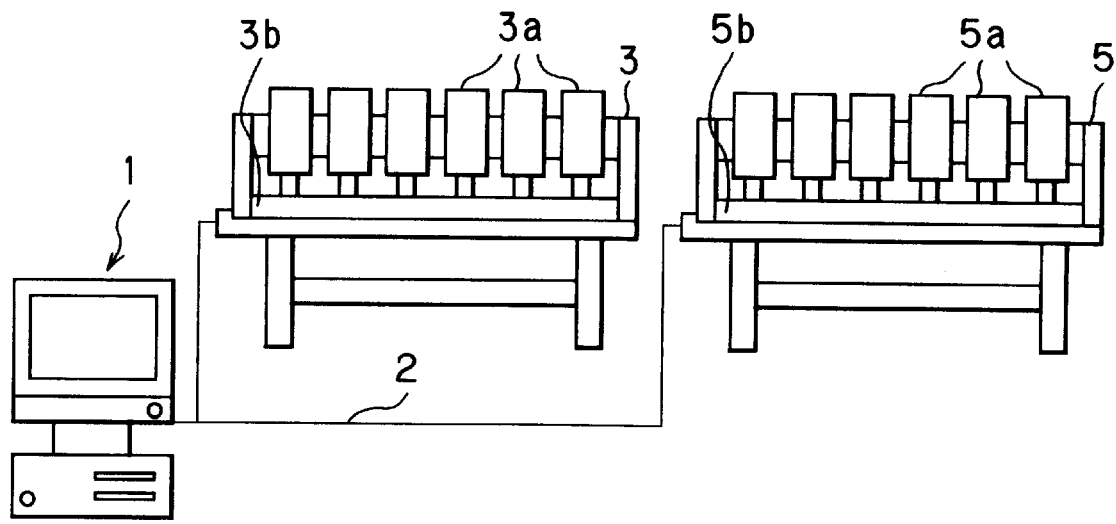
FIG. 1 is a schematic view showing an embroidery sewing machine system according to a first embodiment of the present invention.

A sewing machine control system according to preferred embodiments of the present invention will be described while referring to the accompanying drawings wherein like parts and components are designated by the same reference numerals to avoid duplicating description.

The first embodiment of the present invention will be described while referring to FIGS. 1 through 6. FIG. 1 is a schematic diagram showing an embroidery sewing machine control system according to the first embodiment. As shown in FIG. 1, a personal computer 1 is connected to sewing machines 3 and 5 by a cable 2. The sewing machines 3, 5 are both multi-head type embroidery sewing machines. The sewing machine 3 includes a plurality of heads 3a and a work support frame 3b commonly used with all of the heads 3a. Similarly, the sewing machine 5 includes a plurality of heads 5a and a work support frame 5a b commonly used with all of the heads 5a.

Figure 2:
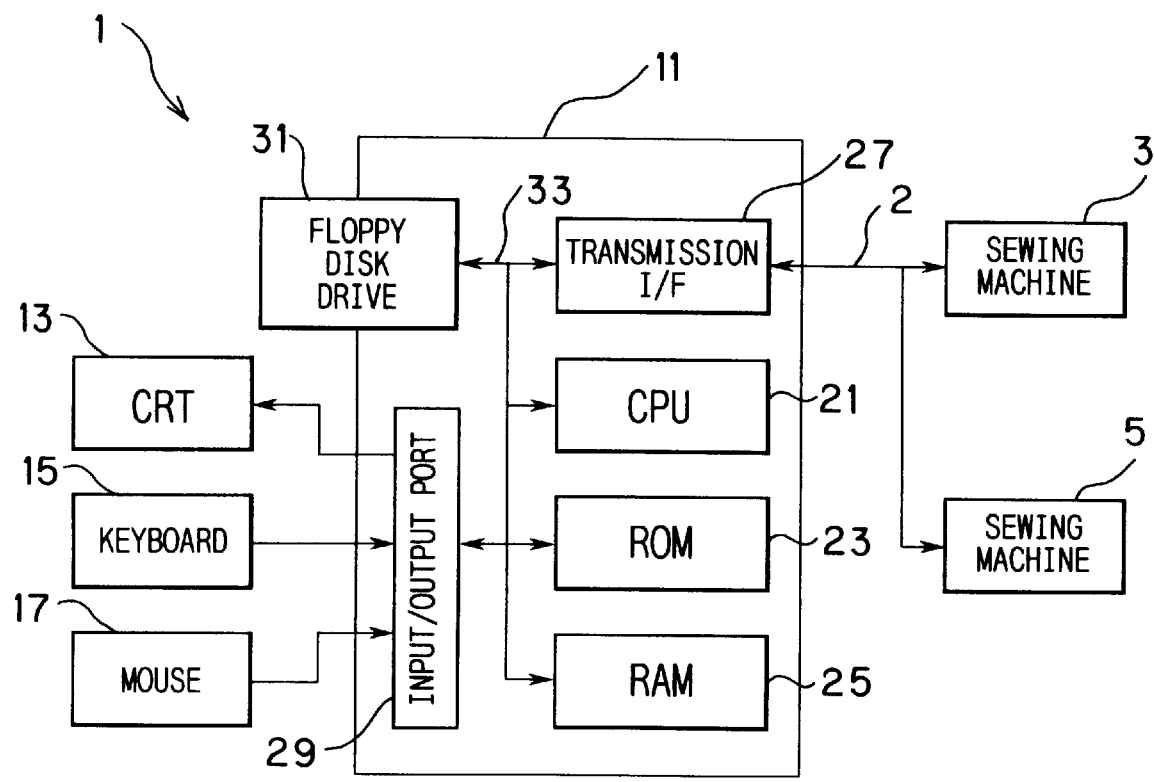
FIG. 2 is a block diagram showing configuration of a personal computer, having a display, according to the system of the first embodiment.

FIG. 2 is a block diagram schematically showing configuration of the personal computer 1. As shown in FIG. 2, the personal computer 1 includes a personal computer body 11, a cathode-ray tube (CRT) 13, a keyboard 15, and a mouse 17. The personal computer body 11 houses a variety of components including: a CPU 21, a ROM 23, a RAM 25, a transmission interface 27, an input/output port 29, and a floppy disk driver 31. The transmission interface 27 is for performing transmission between the personal computer 1 and the sewing machines 3, 5 over the cable 2. The input/output port 29 is for performing transmission and reception of data between the personal computer body 11 and the CRT 13, the keyboard 15, and the mouse 17. The floppy disk driver 31 is for performing reading and writing of data in a floppy disk (not shown in the drawings) which serves as a memory medium. A bus 33 connects the CPU 21, the ROM 23, the RAM 25, the transmission interface 27, the input/output port 29, and the floppy disk driver 31 to enable transmission and reception of data between these different components.

Figure 3:
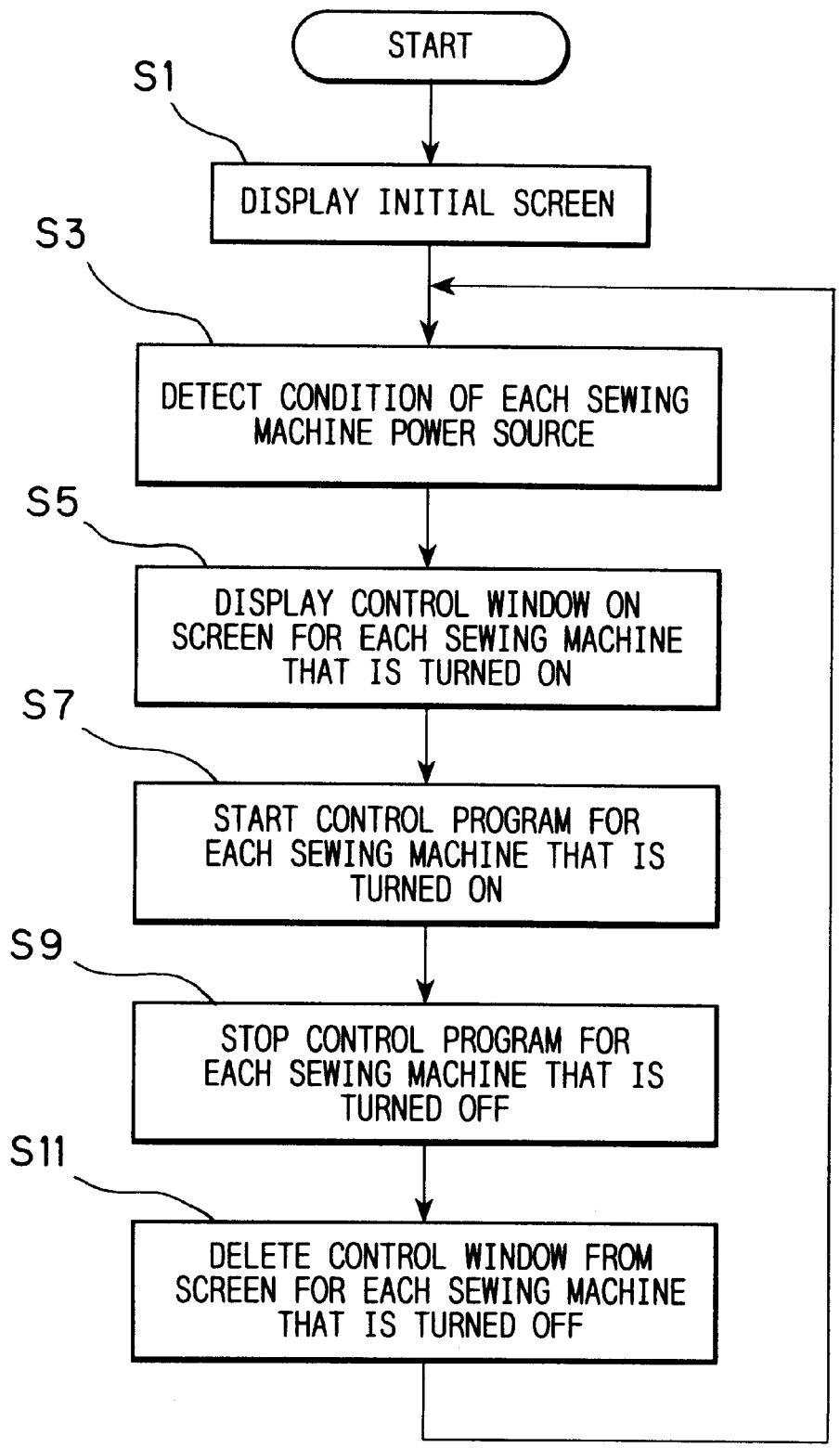
FIG. 3 is a flowchart representing a sewing machine control program executed by the personal computer of the first embodiment.

Next, while referring to the flowchart shown in FIG. 3, an explanation will be provided for sewing machine control processes executed by the CPU 21. The CPU 21 begins execution of processes based on programs stored in the ROM 23 when the power switch of the personal computer 1 is turned on. As shown in FIG. 3, at the start of these processes, the CPU 21 displays an initial screen of the floppy disk driver 31 in Step 1. In the drawings and in the remainder of the specification, steps will be referred to as Si, wherein i=1, 3, 5 . . . i.

Figure 4:
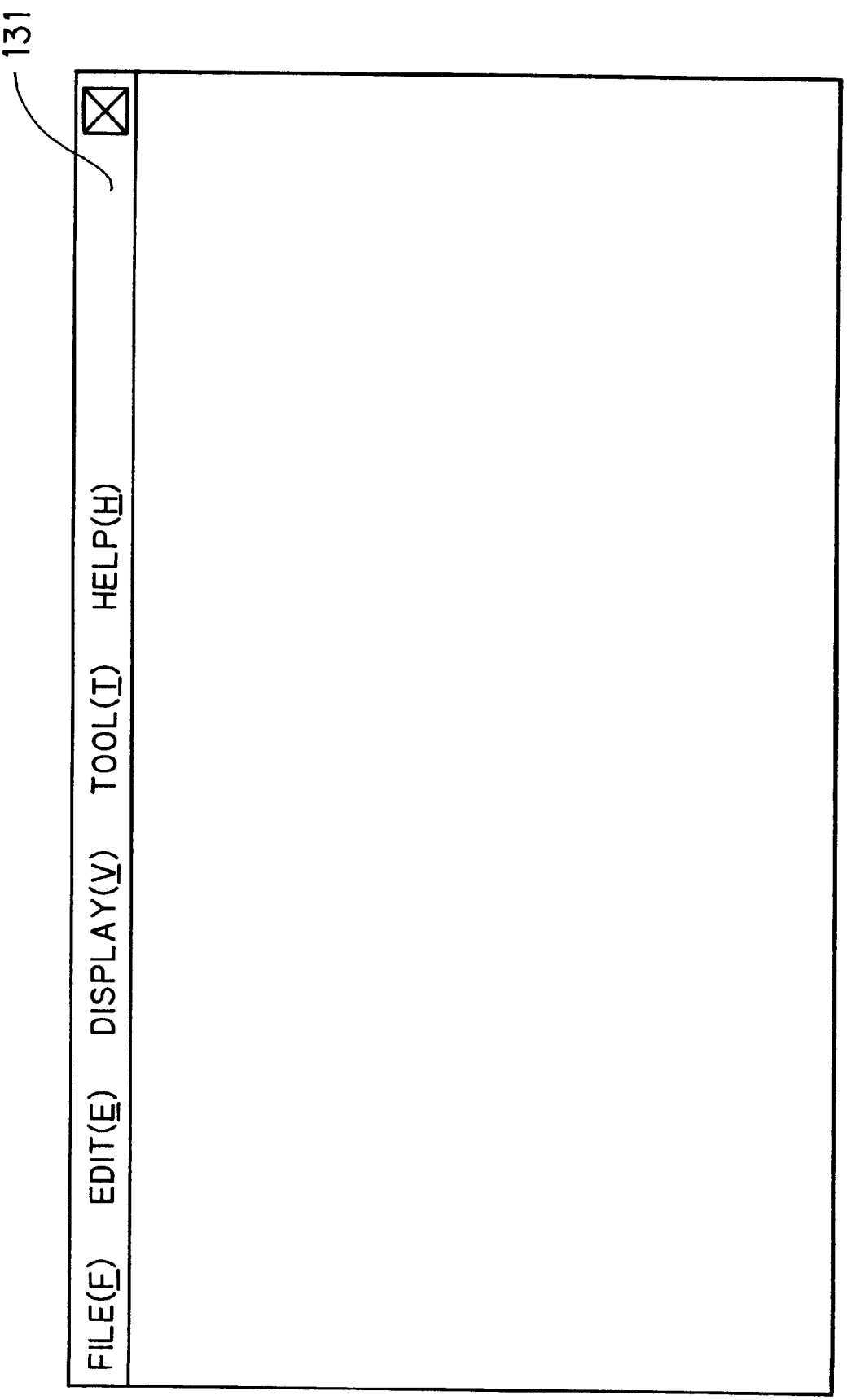
FIG. 4 is a schematic view showing an initial screen display according to the sewing machine control program represented by the flowchart of FIG. 3.

As shown in FIG. 4, the initial screen displays only a single frame 131 on the screen of the CRT 13. Next, in S3, the CPU 21 detects the on/off condition of the sewing machines 3, 5. In other words, the CPU 21 determines whether the power source of the sewing machine 3 is on or off and whether the power source of the sewing machine 5 is on or off. The CPU 21 detects on/off condition of the power sources by transmitting a predetermined signal to the sewing machines 3, 5 and checking whether the sewing machines 3, 5 respond to the signal or not. Those sewing machines which do not respond to the signal are determined to be turned off. Alternatively, the sewing machines 3, 5 can be designed to transmit a predetermined signal to the personal computer 1 when their power sources are in an on condition. When the personal computer 1 does not receive a signal from a sewing machine, it will determine that the sewing machine is turned off.

Figure 5:
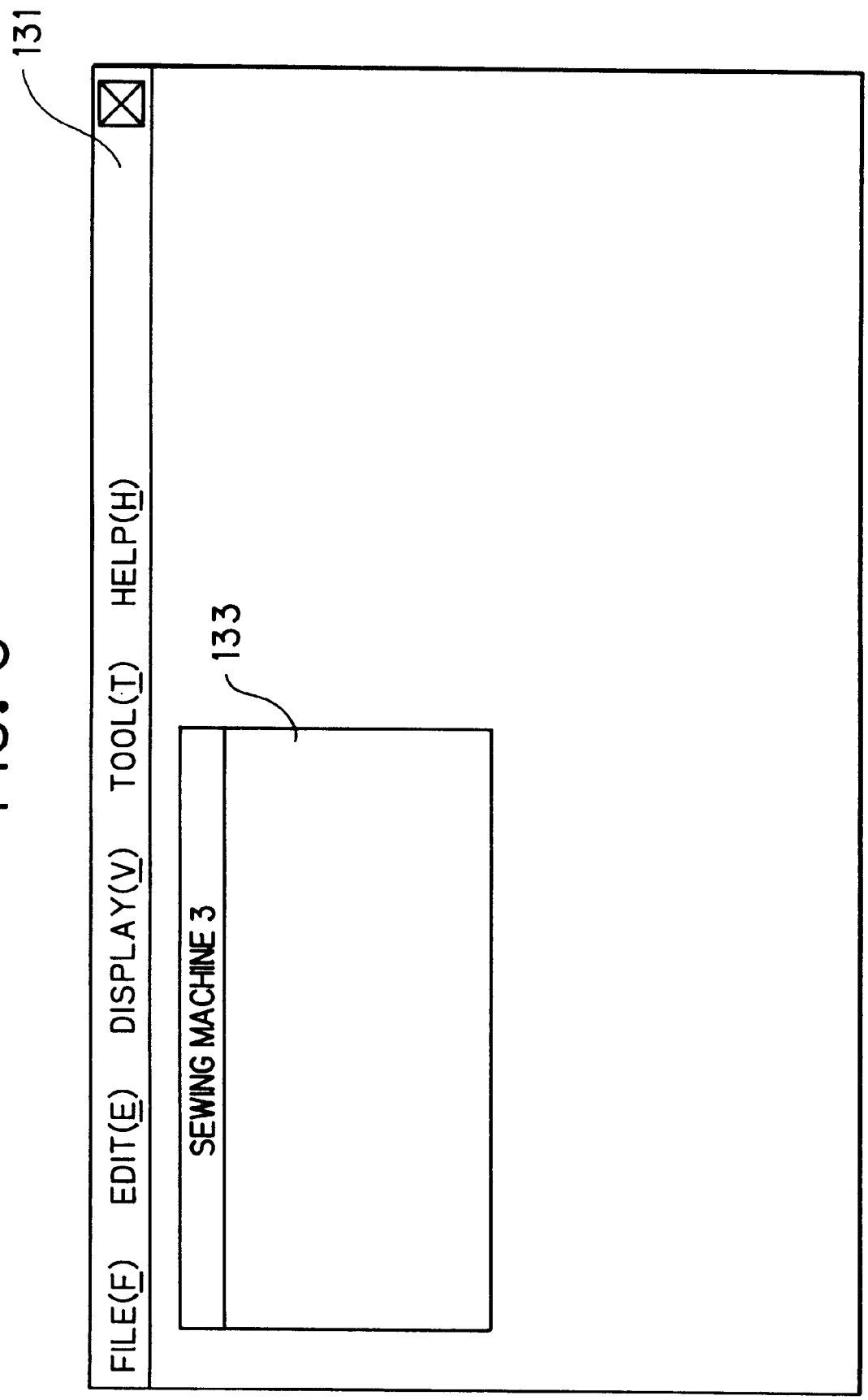

Next in S5, the CPU 21 controls the CRT 13 to display a control window on its screen for each sewing machine determined in S3 to have a turned-on power source. For example, when only the sewing machine 3 is turned on, then as shown in FIG. 5, the CRT 13 will display only a single control window 133 within the frame 131. Next in S7, the CPU 21 starts a control program corresponding to each sewing machine determined to have a turned-on power source. The control programs can be prestored in the ROM 23 or can be retrieved from a floppy disk inserted in the floppy disk driver 31. Then, the CPU 21 displays control information according to operation of the control program. For example, when the sewing machine 3 only is turned on, then the CPU 21 starts up its corresponding control program only and displays control information needed by the operator on the control window 133 in accordance with operation of the control program.

After S7, the program proceeds to S9, whereupon the CPU 21 stops control programs for those sewing machines determined in S3 to have power sources in an off condition. It should be noted that when the sewing machine control process represented by the flowchart in FIG. 3 is first started so that S9 is performed for the first time, then control programs corresponding to the turned-off sewing machines will not have been started yet. Therefore, no action will be taken in S9 and the program will proceed directly to S11.

In S11, the CPU 21 controls the CRT 13 to stop display of each control window corresponding to a turned-off sewing machine. It should be noted that, in the same manner as S9, when the program represented by the flowchart in FIG. 3 has just started so that S11 is performed for the first time, then no control windows will be displayed for the turned-off sewing machines. As a result, no action will be taken in S11 and the program will return to S3. Afterward, S3 to S11 are repeatedly executed.

Figure 6:
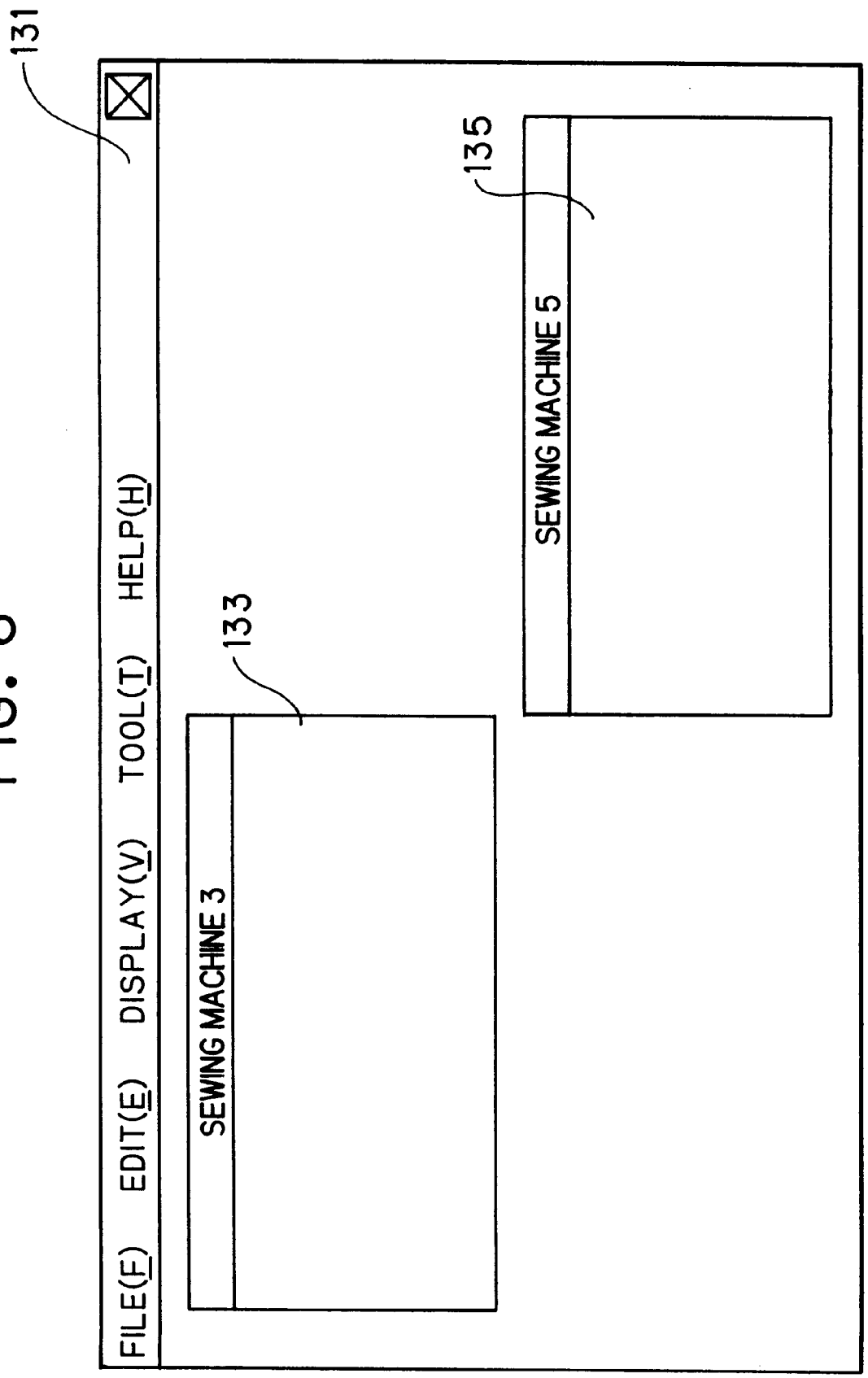

Next, an example will be provided for when the power source of the sewing machine 5 changes from an off condition to an on condition while S3 to S11 are being repeatedly executed. In this case, that the power source of the sewing machine 5 has been turned on will be detected in S3. As shown in FIG. 6, the CPU 21 will control the CRT 13 to display a control window 135 for the sewing machine 5 in the frame 131, in addition to the control window 133 for the sewing machine 3. Next in S5, the CPU 21 will start the control program for the sewing machine 5 and will control the CRT 13 to display control information in the control window 135 based on this control program.

Next, an explanation will be provided for the situation when the power source of the sewing machine 5 changes from an on condition to an off condition while S3 to S11 are repeatedly executed. The CPU 21 will detect in S3 that the power source of the sewing machine 5 has been turned off. As a result, the CPU 21 will stop the control program for the sewing machine 5 in S9. Further in S11, the CPU 21 will control the CRT 13 to stop displaying the control window 135 for the sewing machine 5 so that the control window 135 will be deleted from the frame 131 of the CRT 13. As a result, the screen of the CRT 13 will return to the condition shown in FIG. 5.

When both the power sources of the sewing machines 3, 5 are turned off at the same time, then both of the control programs for the sewing machines 3, 5 will be stopped in S9 and both of the control windows 133, 135 will be deleted in S11. As a result, the screen of the CRT 13 will return to the initial screen shown in FIG. 4. Afterward, the routines of S3 and S11 will continue to be repeatedly executed.

According to the embroidery sewing machine control system of the first embodiment, whether or not the sewing machine is operable, that is, whether or not the power source is turned on or off, is determined for each sewing machine and then, the control windows 133, 135 are displayed only for those sewing machines 3, 5 whose power source is turned on. Then, control information relating to the turned-on ones of the sewing machines 3, 5 is displayed within the corresponding control windows 133, 135.

When an error is generated during control of either of the sewing machines 3, 5, an error message will be displayed within the control windows 133, 135 for the corresponding troubled sewing machines 3, 5. On the other hand, when the power source of either the sewing machines 3, 5 is turned off, then the control windows 133, 135 for the corresponding inoperable sewing machines 3, 5 will not be displayed. Accordingly, regardless of whether an error has been generated or not, the operator can easily determine which sewing machines are turned off and which sewing machines are in an operable condition because their power sources are turned on. In this way, the user can easily grasp the condition of the sewing machines 3, 5 so that management of the sewing machines can be efficiently performed.

Also, according to the system of the first embodiment, control programs are started for those sewing machines that are turned on and control programs are stopped for those sewing machines that are turned off. For this reason, the control programs are started and stopped automatically in association with operational condition, that is, on and off condition of the power sources, of the sewing machines 3, 5. Accordingly, even when operational condition of the sewing machines 3, 5 changes, there is no need for the operator to walk back and forth between the personal computer 1 and the sewing machines 3, 5 so that management of the sewing machines 3, 5 can be more efficiently performed.

Figure 7:
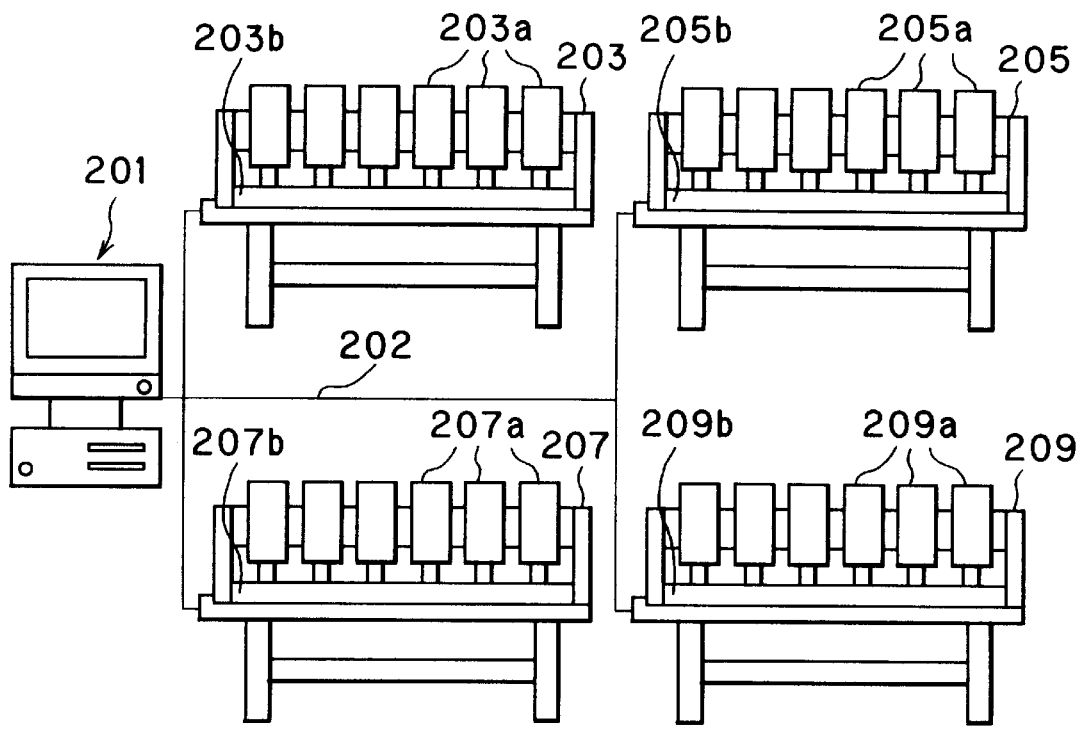
FIG. 7 is a schematic view showing positional configuration of an embroidery sewing machine system according to a second embodiment of the present invention.
Figure 8:
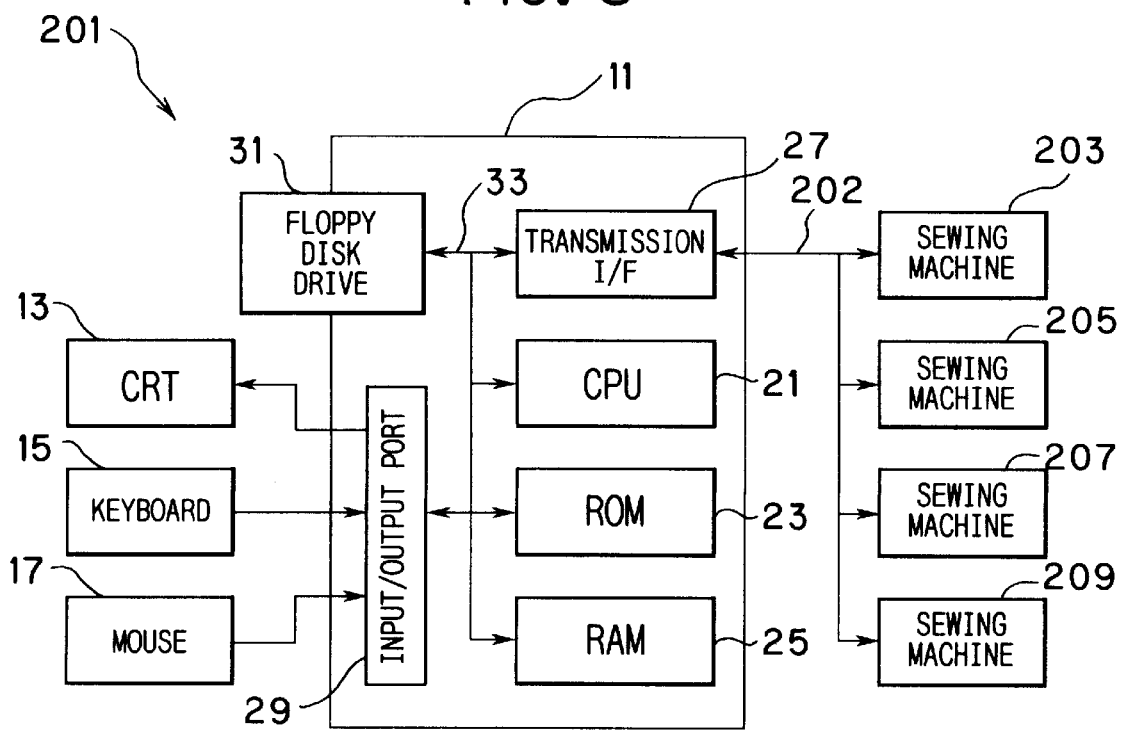
FIG. 8 is a block diagram showing configuration of a personal computer, having a display, of the system according to the second embodiment.

Next, a sewing machine control system according to a second preferred embodiment of the present invention will be explained while referring to FIGS. 7 through 12. As can be seen in FIGS. 7 and 8, the system according to the second embodiment is similar to that described in the first embodiment. However, in the second embodiment, four sewing machines 203, 204, 207, 209 are connected to a single personal computer 201. As can be seen in FIG. 7, the sewing machines 203 to 209 are arranged in two horizontal rows of two sewing machines each, wherein the sewing machines 203 and 205 are in the rear row and the sewing machines 207 and 209 are in the front row. The sewing machines 203 and 207 are to the left of the sewing machines 205 and 209 respectively. The configuration of the personal computer 201 is similar to that of the personal computer 1 of the first embodiment except for a control program to be described later.

Figure 9:
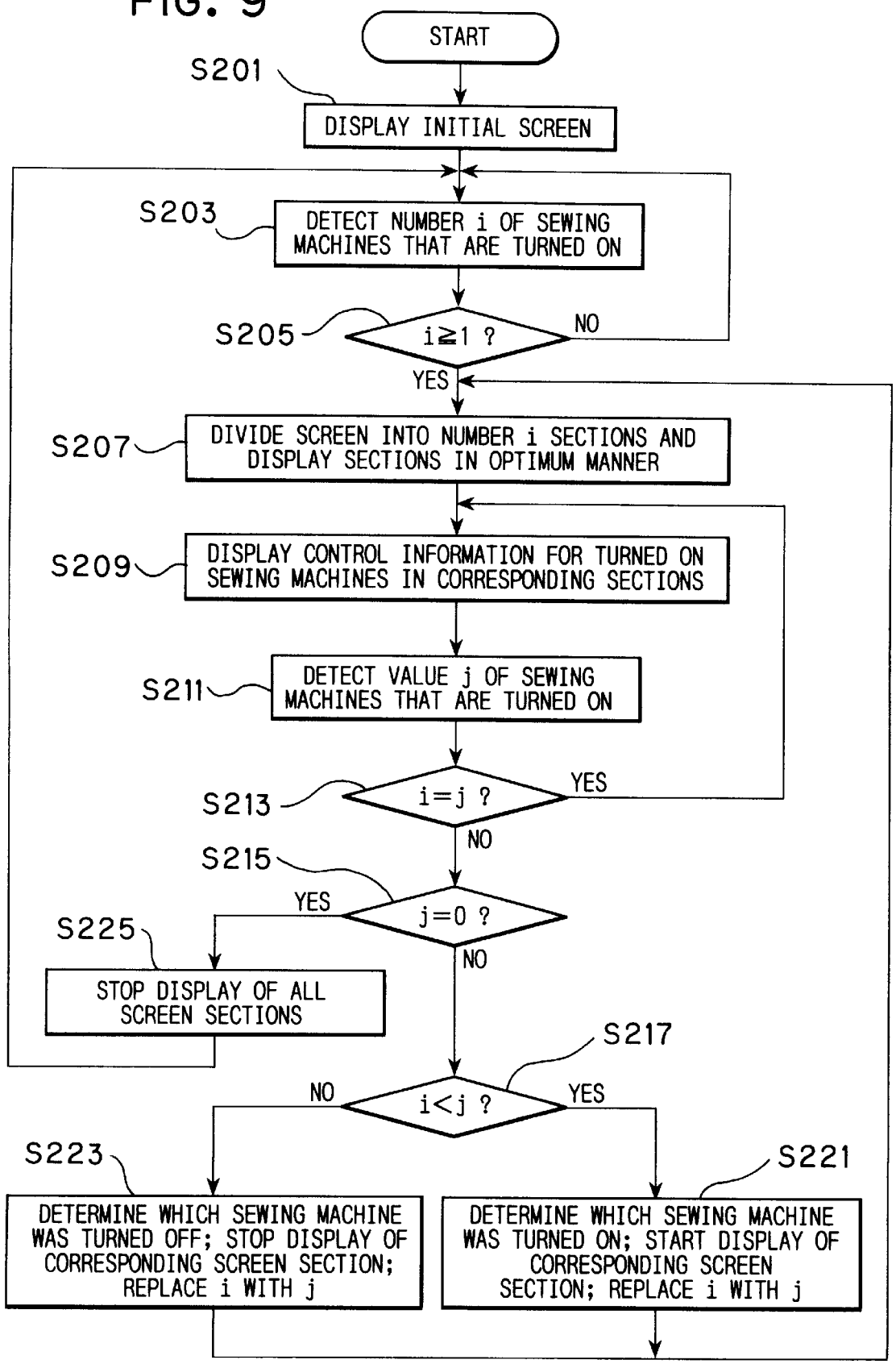
FIG. 9 is a flowchart representing sewing machine control processes executed by the personal computer shown in FIG. 8.

Next, while referring to the flowchart shown in FIG. 9, an explanation will be provided for control processes performed by the CPU 21. The CPU 21 starts the processes represented by the flowchart shown in FIG. 9 when the power of the personal computer 201 is turned on. It should be noted that the processes represented by the flowcharts shown in FIGS. 3 and 9 only relate to control of display on the CRT 13.

As shown in FIG. 9, at the start of these processes, the CPU 21 displays in S201 the initial screen on the CRT 13. In the same manner as described in the first embodiment, the initial screen includes only the frame 131 shown in FIG. 4. Next in S203, the CPU determines the number i of the sewing machines 203 to 209 that have their power source turned on. In a manner similar to that described in the first embodiment, the number of turned-on sewing machines can be detected by the CPU 21 transmitting a predetermined signal to the sewing machines 203 to 209 determining that those who respond to the signal have their power sources turned on. Alternatively, the sewing machines 203 to 209 can be designed so as to transmit a predetermined signal to the personal computer 201 when their power source is turned on.

Next, it is determined in S205 whether or not the number i is equal to or greater than one, that is, whether or not at least one of the sewing machines 203 to 209 has its power source turned on. When the number i is less than one (S205:YES), then the program returns to S203 where again the number i of sewing machines with a turned-off power source is detected. In this way, S203 is repeatedly executed until at least one of the sewing machines 203 to 209 is turned on. When the number i is equal to or greater than one (S205:YES), then the program proceeds to S207, whereupon the CPU 21 divides the area of screen within the frame 131 into sections in a number equal to the number i.

When the CPU 21 divides the area of the screen in S207, it divides the frame 131 so that the resultant screen sections are displayed in an optimum manner. By an optimum manner, it is meant that the resultant screen sections are displayed so as to fill a maximum possible area of the screen without overlapping each other. Furthermore, each screen section is displayed with an optimum height-to-width ratio. Also, the screen sections are displayed in an arrangement representative of the actual arrangement of the sewing machines 203 to 209 prestored in the RAM 25.

Figure 10:
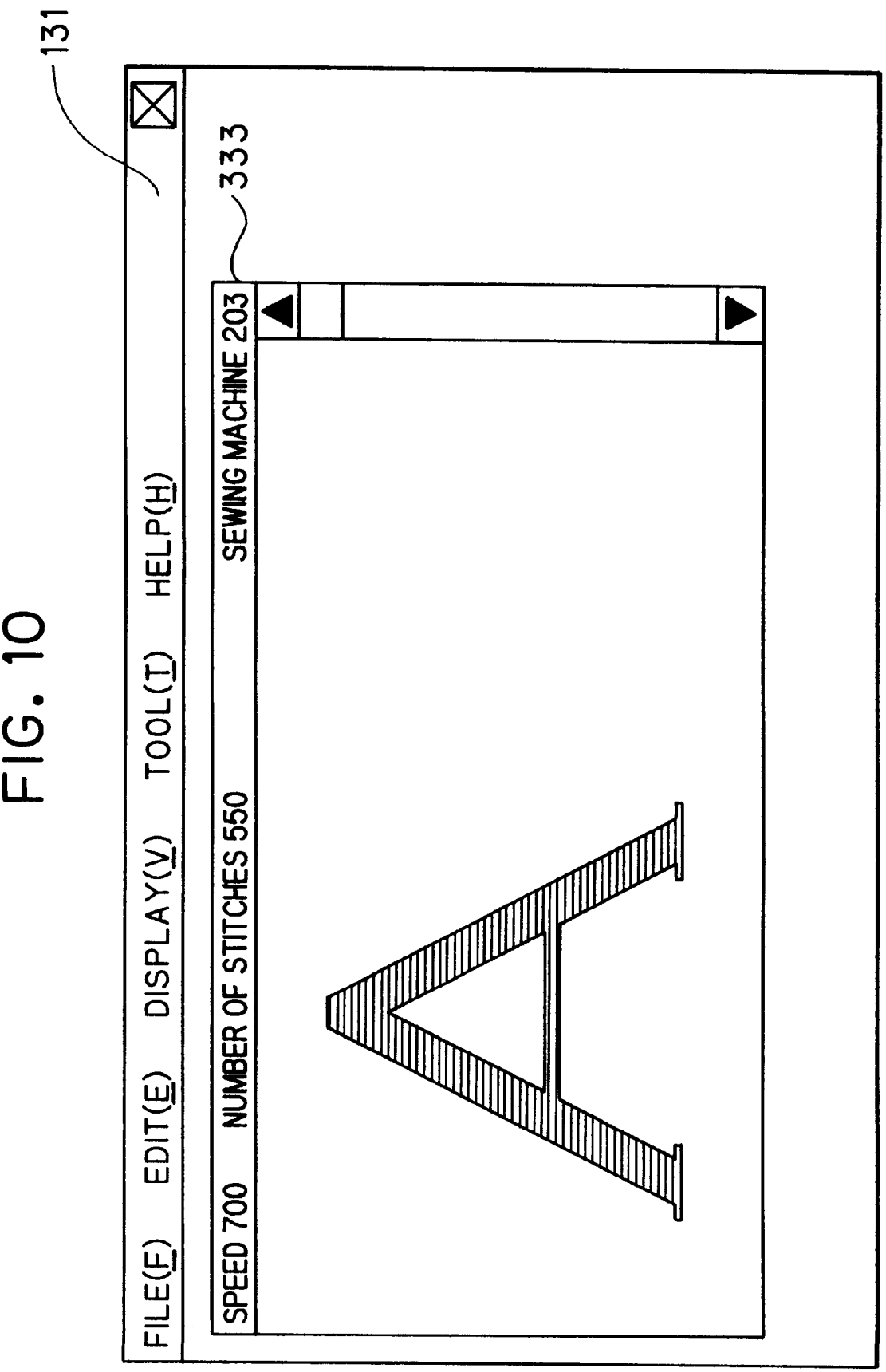

To facilitate understanding of optimum display, an example will be provided for a display within the frame 131 when only the sewing machine 203 has its power source turned on. As shown in FIG. 10, only a screen section 333 for the sewing machine 203 is displayed over a large area within the frame 131.

Figure 11:
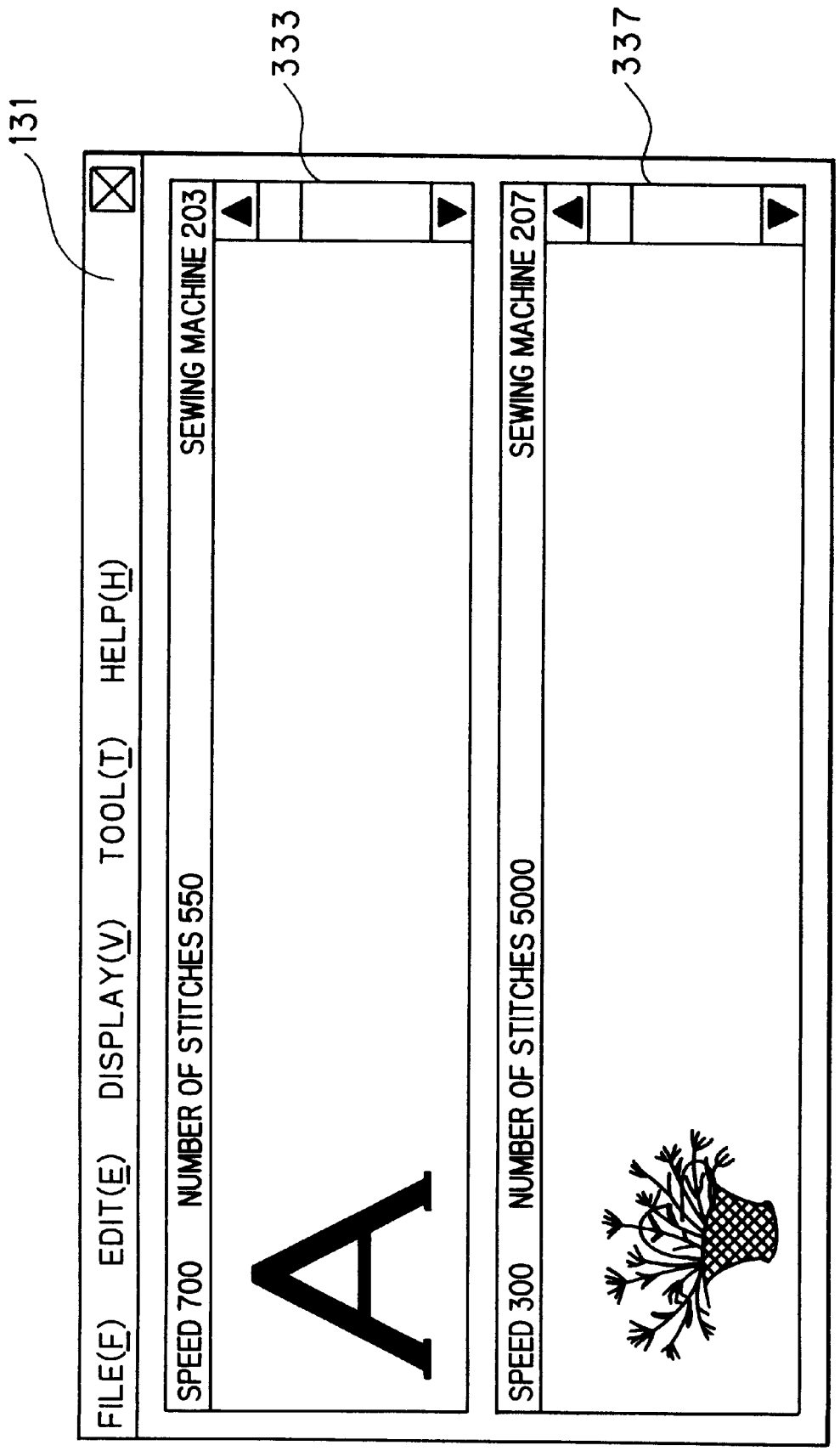

On the other hand, when both the sewing machine 203 and the sewing machine 207 have their power sources turned on at the same time, then as shown in FIG. 11 the frame 131 is divided into the screen section 333 for the sewing machine 203 and also a screen section 337 for the sewing machine 207. Because the sewing machine 207 is disposed to the front of the sewing machine 203, the screen section 333 for the sewing machine 203 is displayed on the upper section, and the screen section 337 for the sewing machine 207 is displayed in the lower section, of the frame 131 to represent the actual positional relationship of the sewing machines 203, 207 shown in FIG. 7.

Figure 12:
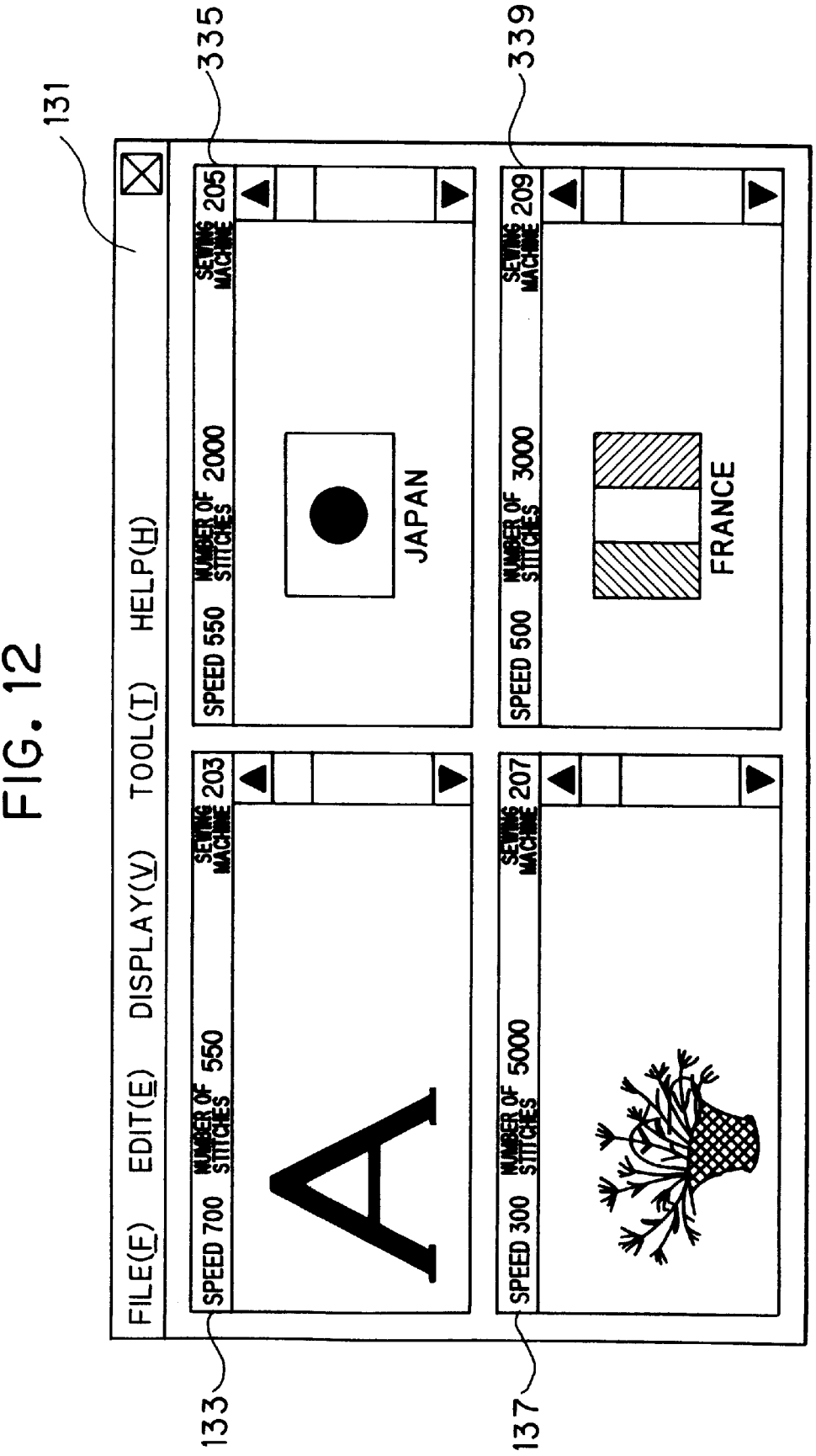

Further, when the power sources of all of the sewing machines 203 to 209 are turned on at the same time, then as shown in FIG. 12, the frame 131 is divided into four screen sections 133, 135, 137, and 139 arranged so as to represent the actual arrangement of the sewing machines 203 to 209. That is, the screen sections 133 and 135 for the sewing machines 203 and 205, respectively, are displayed at the upper half of the frame 131 and the screen sections 137 and 139 for the sewing machines 207 and 209, respectively, are displayed in the lower half of the frame 131. Furthermore, the screen sections 133 and 137 are displayed to the left of the screen sections 135 and 139, respectively, on the frame 131. In this way, the screen sections 333, 335, 337, 339 for the sewing machines 203, 205, 207, 209, respectively are displayed to represent the actual arrangement of the sewing machines 203, 205, 207, 209.

Next in S209, control information for the sewing machines 203 to 209 is displayed in corresponding ones of the screen sections 333 to 339 displayed as a result of division processes performed in S207. In the example shown in FIGS. 10 and 11, control information displayed in the screen sections 333 to 339 includes: embroidery patterns to be sewn by the corresponding sewing machines 203 to 209, the sewing speed of the corresponding sewing machines 203 to 209, and the number of stitches sewn by the corresponding sewing machines 203 to 209. Next in S211, the CPU 21 again detects the number of sewing machines that have their power sources turned on. At this point, however, the number of sewing machines is assigned to a value j.

In S213, whether or not the number i is equal to the value j is determined. If the number i is equal to the value j, then it is determined that no change has occurred in the number of sewing machines with on power sources. In this case (S213:YES), then the program returns to S209 whereupon control information is again displayed on the appropriate screen sections. It should be noted that while the CPU 21 is performing the processes represented in the flowchart in FIG. 9, other routines can be executed for the sewing machines 203 to 209 according to predetermined input from the keyboard 15 or the mouse 17, for example.

When it is determined in S213, that the number i does not equal the value j (S213:NO), then in S215, whether or not the value j is equal to zero is determined. When the value j equals zero, this means that none of the sewing machines 203 to 209 have their power sources turned on. In this case (S215:YES), then in S225, all of the screen sections 333 to 339 are closed so that the initial screen shown in FIG. 4 is displayed and the program returns to S203, whereupon S203 and S205 are repeatedly performed until a power source of one of the sewing machines 203 to 209 is turned on.

If the value j is not equal to zero (S215:NO), then in S217, whether or not the number i is less than the value j is determined. If the number i is less than the value j, then this indicates that the number of sewing machines with their power sources turned on has increased. In this case (S217:YES), then in S221, the identity of the sewing machine that has just had its power source turned on is determined and a screen section corresponding to the sewing machine is newly displayed in the frame 131. Also in S221, the value j is used to replace the number i. Then the program proceeds to S207, whereupon the screen is again divided according to the number i, which represents the number of sewing machines detected in S11, and the sections of the screens are optimally displayed.

On the other hand, when the number of turned-on sewing machines has reduced so that the number i is greater than the value j (S217:NO), then in S223, the identity of the recently turned-off sewing machine is determined and its corresponding display screen is closed. Also, in S223, the number i is replaced with the value j. Afterward, the program proceeds to S207, whereupon, the screen is divided based on the new number i, that is, according to the reduced number of sewing machines, and the resultant screen sections are optimally displayed.

According to the sewing machine system of the second embodiment, whether or not a power source is turned on is determined for each sewing machine. Then, the frame 131 is divided into sections according to the number of sewing machines 203 to 209 with turned-on power sources. Control information for the turned-on sewing machines 203 to 209 is displayed separately in corresponding screen sections 333 to 339 after the frame 131 is divided. As a result, a screen section will be displayed only for sewing machines with a turned-on power source and a screen section will not be displayed for those sewing machines 203 to 209 with a turned-off power source.

With this configuration, the screen area of the CRT 13 can be effectively utilized according to the operating condition of the sewing machines 203 to 209. Because all area of the screen on the CRT 13 is utilized, the maximum amount of control information possible can be displayed on the screen. Information relating to control of each sewing machine can be displayed in greater abundance and greater detail on the screen. This is particularly the case when the sewing machines 203 to 209 are embroidery sewing machines and the screen sections 333 to 339 are used to display embroidery patterns. Embroidery patterns can be complicated and so it is desirable that they be displayed to show as much detail as possible. When the screen sections 333 to 339 are displayed to cover the maximum possible area of the screen, the embroidery patterns can be displayed in a larger size so that their content is easier to see.

Also, the system of the second embodiment divides the screen vertically and horizontally to arrange the screen sections in order on the screen. The screen sections are displayed with a proper length to width ratio to give them desirable shape. For this reason, the screen sections 333 to 339 are easy to view. Also, the screen sections 333 to 339 are displayed in an arrangement corresponding to the actual arrangement of the sewing machines 203 to 209. For this reason, the user can easily grasp which screen section displays control information for which sewing machine. Accordingly, the user will not mistake correspondence relationship between the screen sections and the sewing machines. In this way, the user can more efficiently grasp operation conditions and manage the sewing machines 203 to 209.

Next, a third embodiment of the present invention will be described while referring to FIGS. 13 to 15. Although the arrangement of the sewing machines 203 to 209 was described in the second embodiment as having been pre-stored in the RAM 25, in the third embodiment, the arrangement of the sewing machines 203 to 209 can be assigned by displaying screen sections in the following manner.

FIGS. 13(*a*) to 13(*b*) are schematic views showing the frame 131 displaying an illusory screen for setting arrangement of the sewing machines 203 to 209. The assignment screen can be displayed when predetermined keys of the keyboard 15 are pressed or automatically in succession after S1 is performed in the flowchart shown in FIG. 3 or after S201 is performed in the flowchart shown in FIG. 9.

The assignment screen includes cursors 431 to 491 and sewing machine images 432 to 492. The cursors 431 to 491 indicate the name or number of a corresponding one of the sewing machines 203 to 209. The user can use the keyboard 15 to input the number or name of each of the sewing machines 203 to 209 connected to the personal computer 201. The sewing machine images 432 to 492 each correspond to one of the sewing machines 203 to 209.

Figure 13A:
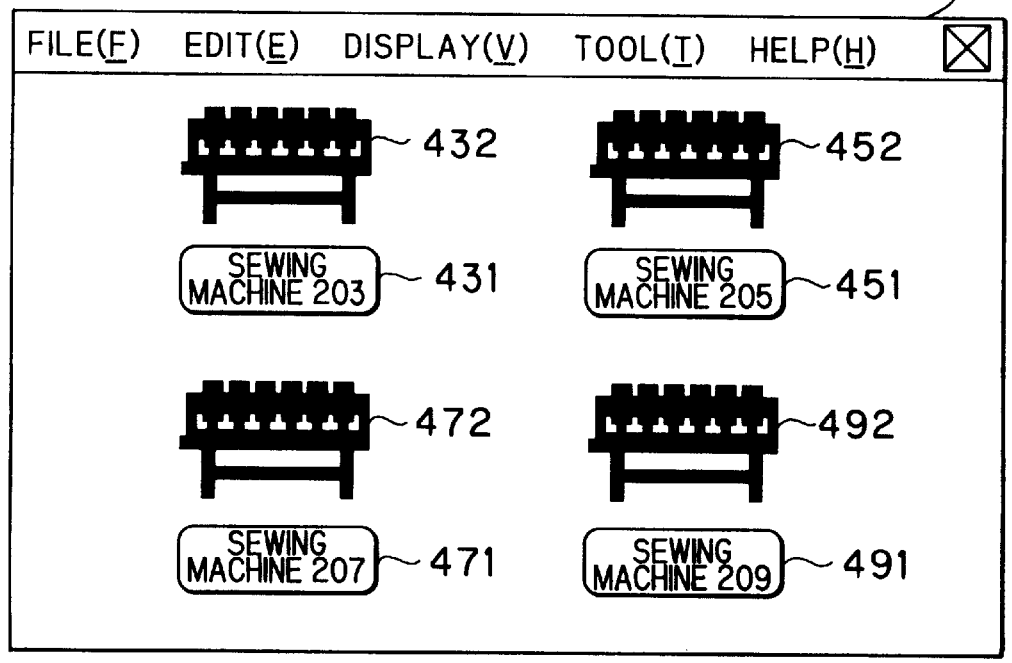
FIG. 13(a) is a schematic view showing a sewing machine arrangement assignment screen according to a third embodiment of the present invention.
Figure 13B:
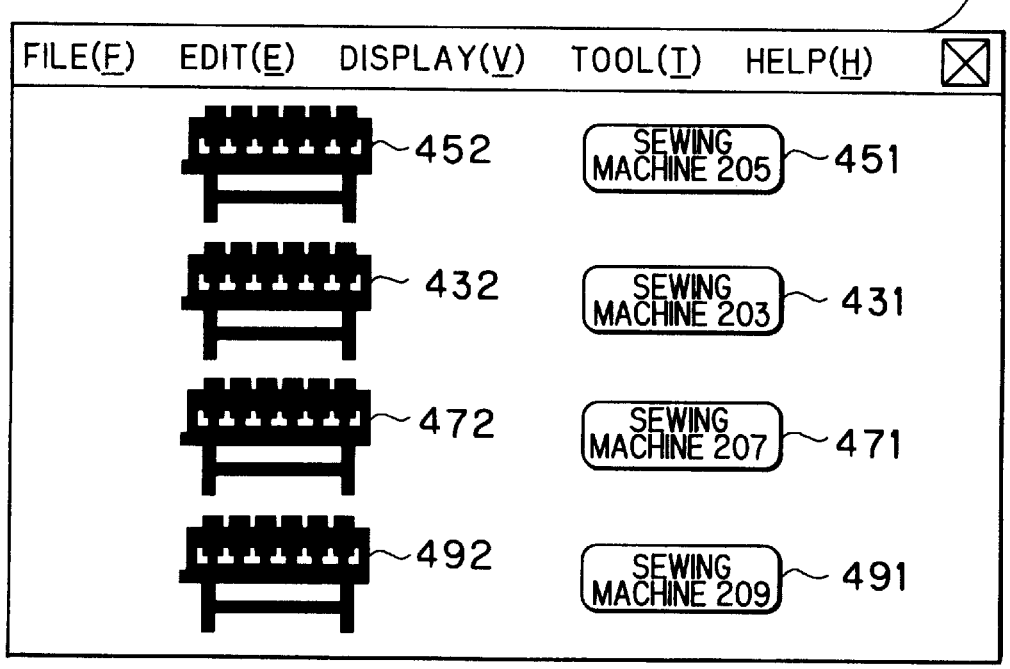
FIG. 13(b) is another example of the sewing machine arrangement assignment screen shown in FIG. 13(a)

When the assignment screen is first displayed, then each cursor 431 to 491 is displayed on the frame 131, but not necessarily in either order shown in FIGS. 13(a) or 13(b). The user uses the mouse 17 to drag the cursors 431 to 491 across the screen into an arrangement that matches the actual arrangement of the sewing machines 203 to 209. The CPU 21 displays the sewing machine images 432 to 492 with corresponding ones of the cursors 431 to 491, but in a manner so they do not interfere with the display of the cursors 431 to 491.

When the sewing machines 203 to 209 are arranged as shown in FIG. 7, then the user arranges the cursors 431 to 491 into the same two by two arrangement of the sewing machines 203 to 209. As shown in FIG. 13(a), in this case, the sewing machine images 432 to 492 are displayed above the corresponding ones of the cursors 431 to 491. After the user assigns arrangement of the sewing machines 203 to 209, the processes represented by the flowchart in either FIG. 3 or FIG. 9 are executed. When power sources of all the sewing machines 203 to 209 are in an on condition, then the screen sections 333 to 339 will be displayed in the arrangement shown in FIG. 12 when.

Figure 14:
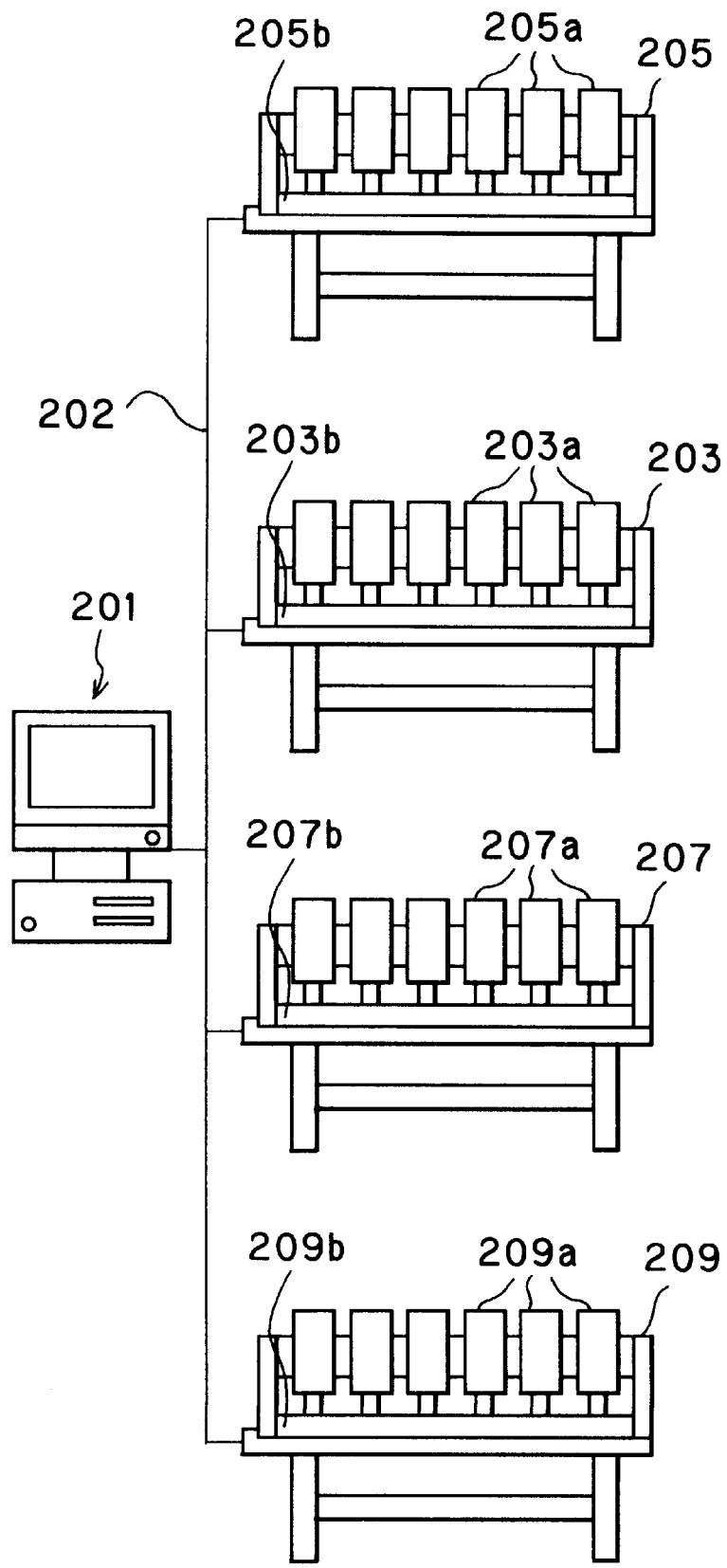
FIG. 14 is a schematic view showing the system of FIG. 7 wherein the sewing machines are arranged differently.
Figure 15:
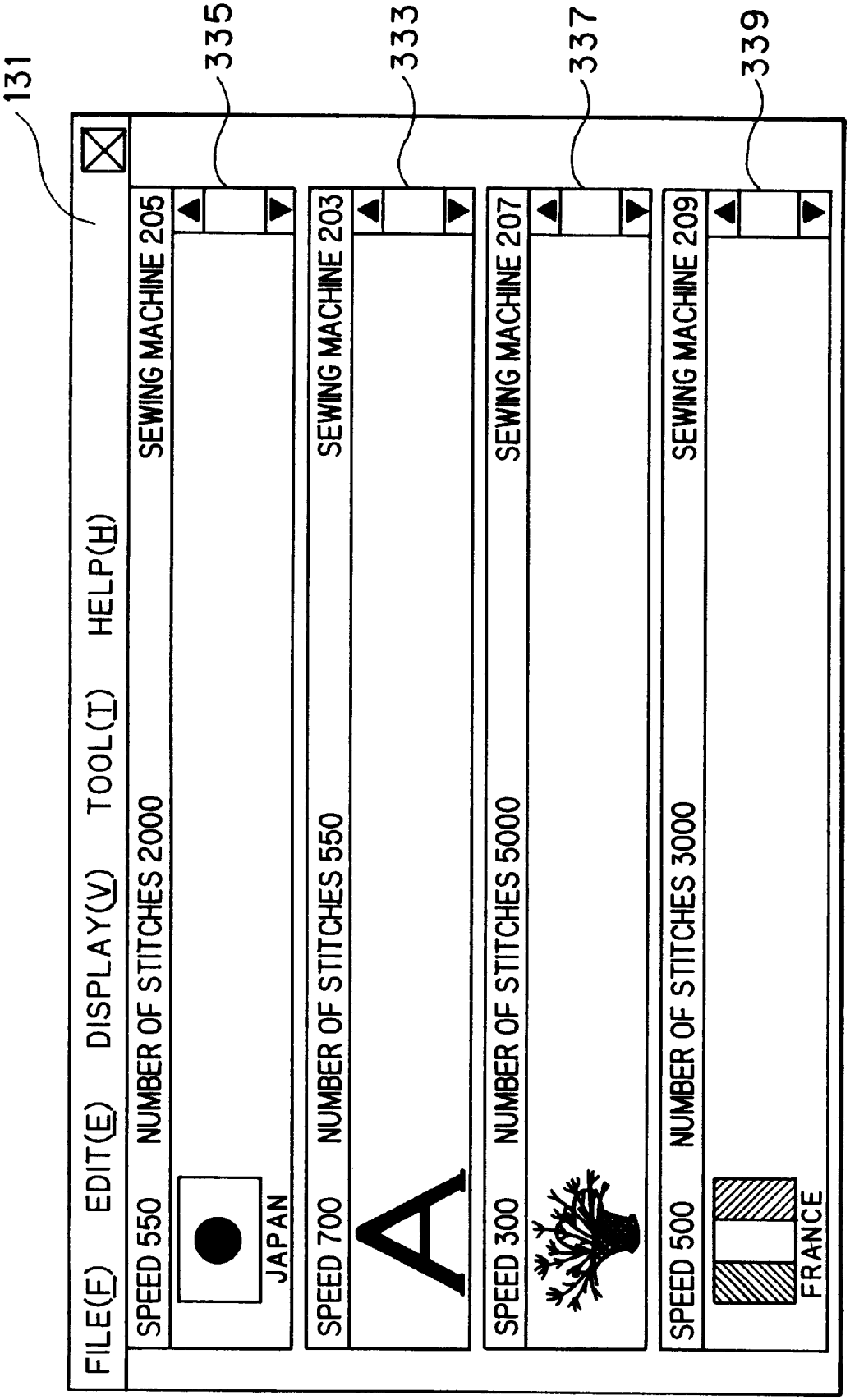
FIG. 15 is schematic view showing arrangement of screen sections displayed in correspondence with the arrangement of sewing machines shown in FIG. 14.

As shown in FIG. 14, the sewing machines 203 to 209 may alternatively be arranged in a line, that is, in the order of: the sewing machine 205, the sewing machine 203, the sewing machine 207, and the sewing machine 209. In this case, the user arranges the cursors 431 to 491 in a vertical line as shown in FIG. 13(b) in the order of: cursor 451, cursor 431, cursor 471, cursor 491. So the sewing machine images 432 to 492 do not interfere with the display of the cursors 431 to 491, the CPU 21 displays the sewing machine images 432 to 492 to the left side of the cursors 431 to 491 instead of above the cursors 431 to 491. After the user assigns display of the sewing machine images 432 to 492, then the processes represented by the flowchart in FIG. 3 or in FIG. 9 are executed. When the power sources for all the sewing machines 203 to 209 are turned on, then the screen sections 333 to 339 will be displayed with the arrangement shown in FIG. 15. In other words, the screen sections 333 to 339 corresponding to the sewing machines 203 to 209 are displayed in a vertically aligned arrangement in the order of the screen section 335, the screen section 333, the screen section 337, and the screen section 339.

In this way, even when the arrangement of the sewing machines 203 to 209 is changed, the user can change the arrangement of the screen sections 333 to 339 accordingly by reassigning the arrangement of the sewing machines 203 to 209 using the assignment screen shown in FIGS. 13(a) and 13(b) so that the arrangement of the screen sections 333 to 339 properly corresponds to the arrangement of the sewing machines 203 to 209. Because the embroidery sewing machine control system of the third embodiment includes a screen for enabling the actual arrangement of the sewing machines, incorrect correspondence between arrangement of the screen sections 333 to 339 and the sewing machines 203 to 209 can be properly prevented regardless of whether changes occur in the arrangement of the sewing machines 203 to 209.

With the configurations of the above-described embodiments, a user can quickly and easily grasp what sewing machines are in an operable condition by merely glancing at the display. Therefore, he or she will not waste time attempting to command a sewing machine to sew an embroidery pattern, for example, when the sewing machine is incapable of operating. Because windows corresponding to turned-off sewing machines are not displayed, a user can further distinguish between turned-off sewing machines and sewing machines that are turned on, but that are malfunctioning and so can not sew embroidery patterns for that reason.

Further, because screen sections are not reserved for non-operable sewing machines, area of the display screen is not wasted. Therefore, when only a small portion of all the sewing machines connected to the same personal computer are normally in operation, the display of operable sewing machines will be sufficiently large and easy to read.

While the invention has been described in detail with reference to specific embodiments thereof, it would be apparent to those skilled in the art that various changes and modifications may be made therein without departing from the spirit of the invention, the scope of which is defined by the attached claims.

Figure 16:
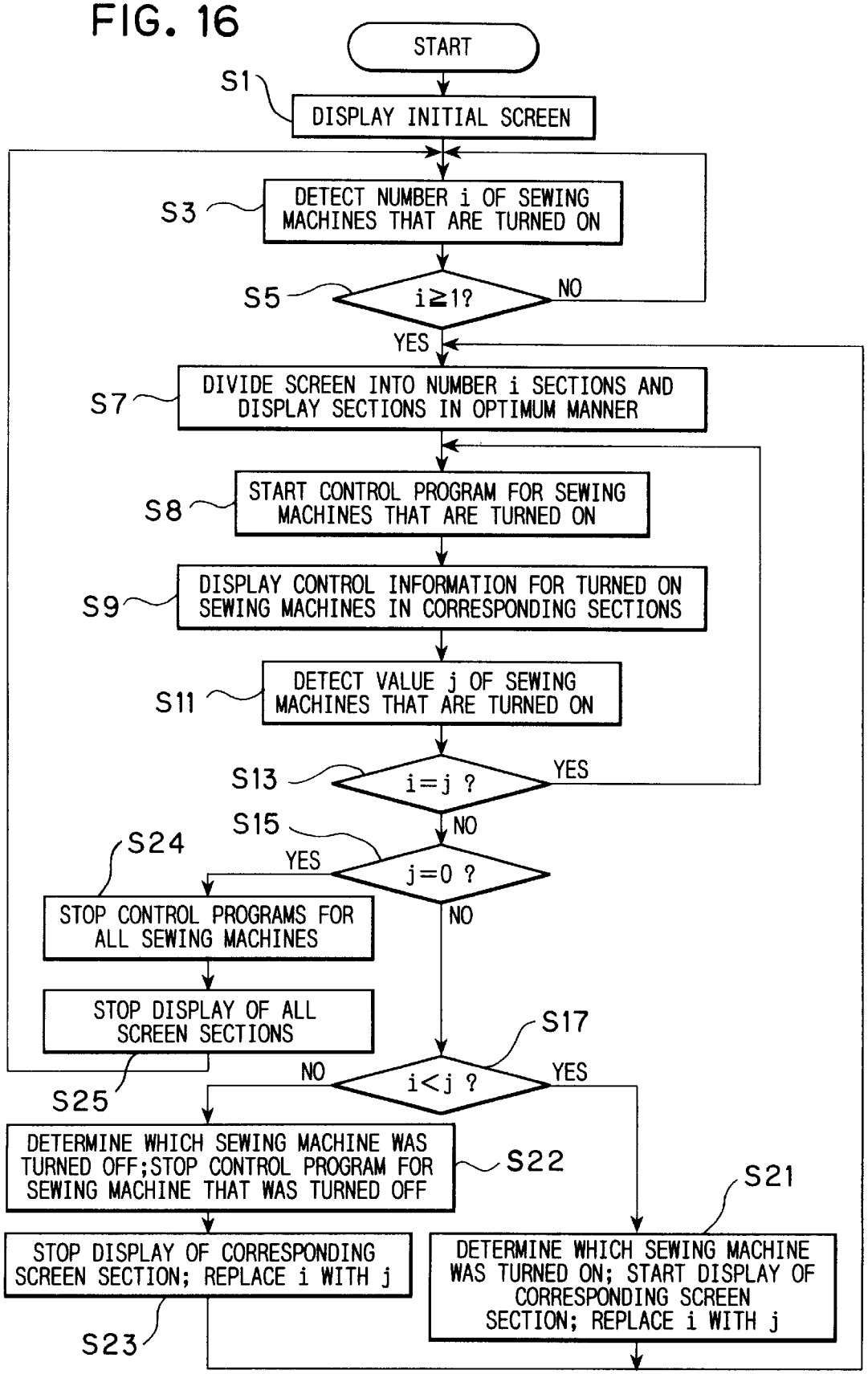
FIG. 16 is a flowchart representing processes performed according to a combination of the first and second embodiments.

For example, the second embodiment can be modified so that the control programs for sewing machines can be automatically started and stopped according to the on/off condition of the sewing machine power sources. FIG. 16 is a flowchart representing processes performed in such a modification of the second embodiment. The processes performed in this modification are the same as those performed in the second embodiment but with the addition of S8, S24, and S22. That is, after the screen is divided and the screen sections optimally displayed in S7, then in S8, control programs for turned-on sewing machines are started. Then, S8 through S13 are repeated as long as no change in the number of turned-on sewing machines occurs.

However, when the number of sewing machines with a turned-on power source drops to zero (S15:YES), then in S24, control programs for all sewing machines are stopped before all the screen sections are closed in S25. On the other hand, when the number of turned-on sewing machines is reduced (S17:NO), then in S22 which sewing machine was turned off is determined and the control programs corresponding to the newly turned-off sewing machine is stopped before display of the corresponding screen section is stopped in S23. When the number of sewing machines with turned-on power sources increases (S17:YES), then after the processes of S21 and S7 are performed, then in S8 control programs corresponding to newly turned-on sewing machines are started.

Although the embodiments described the personal computer being connected to the sewing machines by a cable, the personal computer and the sewing machines can be provided with a wireless transmission system instead. Also, the system described in the embodiments controls display on the CRT and stopping and starting of control programs according to the on/off condition of power sources of the sewing machines. However, even if the power source of the sewing machines is determined to be on, if a work-piece cloth is not set in the work support frame of one of the sewing machines, then a screen section need not be provided for that sewing machine. Further, a special sensor need not be provided for determining on/off condition of power source. Instead, the on/off condition of power source can be determined by a rather simple computer process. Accordingly, configuration and processes of the above-described system can be further simplified.

The present invention is not limited to use in embroidery sewing machines, but can be applied to control devices for general sewing machines as well. However, a plurality of embroidery sewing machines are often controlled simultaneously using a single control device such as a personal computer. Accordingly, the present invention is particularly affective when used in a system for controlling a plurality of embroidery sewing machines. Further, although the present embodiments described each sewing machine as being assigned a number that are displayed in the corresponding windows, instead each sewing machine can be assigned a name such as "Mickey" or "Joe" and the name be displayed instead.

What is claimed:

1. A sewing machine control device capable of controlling a plurality of sewing machines, the sewing machine control device comprising:

a display unit having a screen;

an operability judgment unit that judges whether one of the plurality of sewing machines is operable; and a window displaying unit that displays, on the screen of the display unit, a window only for each operable sewing machine.

2. A sewing machine control device as claimed in claim 1, further comprising a display control unit that controls the display unit to display control information in each window so that each window and control information displayed therein correspond to the same sewing machine.

3. A sewing machine control device as claimed in claim 2, wherein the operability judgment unit judges inoperable sewing machines of the plurality of sewing machines.

4. A sewing machine control device as claimed in claim 3, further comprising a program control unit that starts control programs for each operable sewing machine judged to be operable by the operability judgment unit and stops control programs for each inoperable sewing machine judged to be inoperable by the operability judgment unit.

5. A sewing machine control device as claimed in claim 3, wherein the operability judgment unit monitors change in operability of the plurality of sewing machines to judge when operable sewing machines change to inoperable sewing machines, and further comprising a window deletion unit that, when the operability judgment unit judges that an operable sewing machine becomes an inoperable sewing machine, deletes a window corresponding to the inoperable sewing machine from the screen of the display unit.

6. A sewing machine control device as claimed in claim 1, further comprising a program control unit that starts control programs for each operable sewing machine.

7. A sewing machine control device as claimed in claim 6, wherein:

the operability judgment unit judges a number of operable sewing machines of the plurality of sewing machines; and the window displaying unit divides display of the screen into equal sections according to the number of operable sewing machines and displays a window in each section.

8. A sewing machine control device capable of controlling a plurality of sewing machines, the sewing machine control device comprising:

a display unit having a screen;

an operability judgment unit that judges whether one of the plurality of sewing machines is operable; and a window displaying unit that displays, on the screen of the display unit, a window for each operable sewing machine, wherein the operability judgment unit judges inoperable sewing machines of the plurality of sewing machines.

9. A sewing machine control device as claimed in claim 8, further comprising a program control unit that starts control programs for each operable sewing machine judged to be operable by the operability judgment unit and stops control programs for each inoperable sewing machine judged to be inoperable by the operability judgment unit.

10. A sewing machine control device as claimed in claim 9, wherein:

the operability judgment unit judges a number of operable sewing machines of the plurality of sewing machines; and the window displaying unit divides display of the screen into equal sections according to the number of operable sewing machines and displays a window in each section.

11. A sewing machine control device as claimed in claim 8, wherein the operability judgment unit monitors change in operability of the plurality of sewing machines to judge when operable sewing machines change to inoperable sewing machines, and further comprising a window deletion unit that, when the operability judgment unit judges that an operable sewing machine becomes an inoperable sewing machine, deletes a window corresponding to the inoperable sewing machine from the screen of the display unit.

12. A sewing machine control device as claimed in claim 11, wherein:

the operability judgment unit judges a number of operable sewing machines of the plurality of sewing machines; and the window displaying unit divides display of the screen into equal sections according to the number of operable sewing machines and displays a window in each section.

13. A sewing machine control device as claimed in claim 1, wherein the operability judgment unit judges operability of each sewing machine based on whether a power source of each sewing machine is on.

14. A sewing machine control device as claimed in claim 1, wherein the plurality of sewing machines are embroidery sewing machines.

15. A sewing machine control device as claimed in claim 1, further comprising a section layout unit for indicating to the window displaying unit a particular arrangement of the plurality of sewing machines so that the window displaying unit displays windows on the screen of the display unit according to the particular arrangement of the plurality of sewing machines.

16. A sewing machine control device as claimed in claim 1, wherein:

the operability judgment unit judges a number of operable sewing machines of the plurality of sewing machines; and the window displaying unit divides display of the screen into equal sections according to the number of operable sewing machines and displays a window in each section.

17. A sewing machine control device capable of controlling a plurality of sewing machines, the sewing machine control device comprising:

a display unit having a screen;

an operability judgment unit that judges a number of operable sewing machines of the plurality of sewing machines; and a screen division unit that divides display of the screen into sections according to the number of operable sewing machines judged by the operability judgment unit.

18. A sewing machine control device as claimed in claim 17, further comprising a control information display unit that controls the display unit to display control information for an operable sewing machine in each section of the screen.

19. A sewing machine control device as claimed in claim 17, wherein the screen division unit divides display of the screen into equal sections based on the number judged by the operability judgment unit so that each section is displayed with a maximum area.

20. A sewing machine control device as claimed in claim 17, wherein the screen of the display unit has a vertical height and a horizontal width, the screen division unit dividing the screen so that sections extend substantially equal to the horizontal width.

21. A sewing machine control device as claimed in claim 17, wherein the screen of the display unit has a vertical height and a horizontal width, the screen division unit dividing the screen so that sections extend substantially equal to the vertical height.

22. A sewing machine control device as claimed in claim 17, further comprising a section layout unit for indicating to the screen division unit a particular arrangement of the plurality of sewing machines so that the screen division unit divides the screen according to the particular arrangement of the plurality of sewing machines.

23. A sewing machine control device as claimed in claim 17, wherein the plurality of sewing machines are embroidery sewing machines and the display unit displays embroidery patterns to be sewn by the plurality of the sewing machines in corresponding windows.

24. A sewing machine control device as claimed in claim 17, wherein:

the operability judgment unit monitors change in the number of operable sewing machines of the plurality of sewing machines; and the screen division unit adds and deletes sections according to change judged by the operability judgment unit.

25. The sewing machine control device according to claim 1, wherein the operability judgment unit judges that a sewing machine is operable when a work-piece cloth is set in a work support frame.

26. A sewing machine control device capable of controlling a plurality of sewing machines, the sewing machine control device comprising:

a display unit having a screen;

an operability judgment unit that judges whether one of the plurality of sewing machines is operable;

a window displaying unit that displays, on the screen of the display unit, a window for each operable sewing machine; and a display control unit that controls the display unit to display sewing information in each window so that each window and sewing information displayed therein correspond to the same sewing machine.

* * * * *